United States Patent [19]

Gründken et al.

[11] 4,157,751

[45] Jun. 12, 1979

[54] SCRAPER-CHAIN CONVEYORS

[75] Inventors: Dieter Gründken, Lunen; Manfred Redder, Bergkamen-Oberaden, both of Fed. Rep. of Germany

[73] Assignee: Gewerkschaft Eisenhutte Westfalia, Fed. Rep. of Germany

[21] Appl. No.: 824,772

[22] Filed: Aug. 15, 1977

[30] Foreign Application Priority Data

Aug. 13, 1976 [DE] Fed. Rep. of Germany ....... 2636527

[51] Int. Cl.² .............................................. B65G 19/28
[52] U.S. Cl. ..................................... 198/735; 198/861
[58] Field of Search ............... 198/735, 758, 861, 860; 248/298; 299/43, 64

[56] References Cited

U.S. PATENT DOCUMENTS 3,583,552   6/1971   Renwick ......................... 198/735 X

FOREIGN PATENT DOCUMENTS 2401835   7/1975   Fed. Rep. of Germany ........... 198/735
3871125  10/1973   U.S.S.R. ..................... 198/735

Primary Examiner—Robert B. Reeves
Assistant Examiner—Douglas D. Watts
Attorney, Agent, or Firm—Sughrue, Rothwell, Mion, Zinn and Macpeak

[57] ABSTRACT

Connection means for connecting two adjacent channel sections of a scraper-chain conveyor comprises two coupling elements fastened to the outer sides of the adjacent ends of the channel sections, and a coupling member for connecting the two coupling elements. The coupling member has a shank provided at each end with an enlarged head portion. The coupling elements are provided with laterally open recesses for receiving, with a predetermined amount of axial play, the coupling member. One of the coupling elements is provided with a projection which mates, with an all-round clearance, with a recess in the other coupling element. One head portion of the coupling member is provided with an axially extending locking member which extends behind a complementary locking member fastened to one of the channel sections. The other head portion of the coupling member is provided with at least one locking projection which co-operates with a corresponding locking recess in the adjacent coupling element.

11 Claims, 7 Drawing Figures

SCRAPER-CHAIN CONVEYORS

BACKGROUND TO THE INVENTION

This invention relates to scraper-chain conveyors as used in mining, and in particular to connection means for connecting the channel sections of such a conveyor.

A variety of devices for connecting the individual channel section of scraper-chain conveyors are known. Such devices normally resist tensile forces which tend to draw the ends of the channel sections apart, and allow some angular mobility between the channel section ends. The connection devices are often subjected to very high forces during operation, not only the tensile forces which they are designed to resist but also buckling forces tending to displace the conveyor ends laterally and/or vertically. Primarily, the lateral forces occur when the conveyor is shifting up to follow the mineral winning progress. This is usually accomplished by means of rams which shift individual lengths of the conveyor in the so-called "snaking" movement. The vertical forces usually occur when a mining machine supported on the conveyor is moved, for example, along the mineral face. Where the floor of the mine working is uneven, these lateral and vertical forces can increase substantially.

One known form of device for connecting the individual channel sections of a scraper-chain conveyor is constituted by a coupling member in the form of a shank provided at each end with a frustoconical centering head (see Nos. DT-PS 2,355,325 and DT-PS 2,400,486). The coupling member is introduced into aligned apertures in coupling elements which are welded onto the channel section ends and the coupling member is secured thereto by means of detachable retaining elements such as C-shaped spring clips. Unfortunately, the coupling member has to be introduced into the aperture in the coupling elements from the front side of the channel sections. Although, this form of device can cope with high working loads whilst occupying a relatively small amount of space, it has the added disadvantage that the retaining elements are loaded by the forces transmitted through the device during mining operations, and this loading can cause them to be detached accidentally, which in turn can lead to the coupling member itself dropping laterally from the coupling elements.

Another known way of connecting the individual channel sections of a scraper-chain conveyor is to provide interlocking coupling elements on the adjacent ends of each pair or adjacent channel sections. One coupling element is provided with a projection which mates, with an all-round clearance, with a recess in the other coupling element. This permits the required angular mobility between adjacent channel sections. Each pair of interlocked coupling elements is connected together by means of screw bolts so that the tensile forces can be transmitted between the channel section ends. This results in a fairly slow and complicated assembly and disassembly process.

It is also known, from No. DT-OS 1,937,018, to join the interlocking coupling elements together by means of a coupling member of the type having an enlarged head at each end of a threadless shank, in which case laterally open recesses are provided in the coupling elements for receiving the coupling member. Here again, however, special retaining elements are necessary to complete the connection, and these can be dislodged during operation.

It is the aim of the invention to provide a connection means for interconnecting the channel sections of a scraper-chain conveyor, the connection means being capable of simple and rapid assembly and disassembly but being such that unintentional disassembly during mining operations is prevented.

SUMMARY OF THE INVENTION

The present invention provides connection means for connecting two adjacent channel sections of a scraper-chain conveyor, the connection means comprising two coupling elements which, in use, are fastened to the outer sides of the adjacent ends of the channel sections, and a coupling member for connecting the two coupling elements, the coupling member having a shank provided at each end with an enlarged head portion, the coupling elements being provided with laterally open recesses for receiving, with a predetermined amount of axial play, the coupling member, one of the coupling elements being provided with a projection which mates, with an all-round clearance, with a recess in the other coupling element, wherein one head portion of the coupling member is provided with an axially extending locking member which, in use, extends behind a complementary locking member fastened to one of the channel sections, and wherein the other head portion of the coupling member is provided with at least one locking projection, the or each locking projection cooperating, in use, with a corresponding locking recess provided in the adjacent coupling element.

Thus, with this form of connection means, the coupling member is locked positively at both its head portions against lateral removal from the recess in the coupling elements. This means that the channel sections can be loaded, particularly in the event of horizontal buckling, without the coupling member accidentally slipping out in a lateral direction.

Where necessary, the connection means may further include a retaining element which is detachably fixable to the other channel section so as to prevent axial movement of the coupling moment by filling up the space available for said predetermined amount of axial play. Advantageously, the retaining element is such that it is not loaded by the forces transmitted through the connection means. In particular, where the channel sections have side walls of a generally sigma-shaped cross-section, the retaining element preferably is a substantially C-shaped spring clip which can be inserted into the V-shaped portion of the side wall of said other channel section.

Preferably, the free ends of the legs of the spring clip converge towards each other and are so dimensioned as to lie, in use, against the wall portions of the said other channel section which define its V-shaped portion. In this way, a firm and rotationally secure clamp fit of the spring clip is obtained.

Advantageously, the or each locking recess is provided in said one coupling element.

Preferably, said other head portion is provided with a pair of locking projections which are defined by recesses formed in that part of said other head portion which merges with the shank.

The invention also provides a scraper-chain conveyor comprising a plurality of channel sections, each adjacent pair of channel sections being connected together by connection means as defined above, the two coupling elements of each connection means being fastened to the outer sides of the adjacent ends of the corresponding channel sections.

Advantageously, the spring clip of each connection means is locked in position behind flanges provided on the associated channel section.

Preferably, each of the channel sections is provided with a respective spill-plate holder positioned adjacent to each of its two coupling elements, wherein one the spill-plate holders of each channel section constitutes the complementary locking member of the connection means associated with one adjacent channel section, and the other spill-plate holder of that channel section defines a seat for the detachable fixing of the retaining element of the connection means associated with the other adjacent channel section. In this case, the flanges associated with each connection means may be provided on the adjacent spill-plate holder.

The invention further provides a coupling member for use with the connection means defined above, the coupling member comprising a shank of generally square cross-section, the shank being provided at each end with an enlarged head portion of generally triangular cross-section, wherein one of the head portions is provided with an axially extending locking member of generally trapezoidal shape, and wherein the other head portion is provided with a pair of locking projections defined by recesses formed in that part of that head portion which merges with the shank.

BRIEF DESCRIPTION OF THE DRAWINGS

The invention will now be described, by way of example, with reference to the accompanying drawings, in which.

DESCRIPTION OF PREFERRED EMBODIMENT

Figure 1:
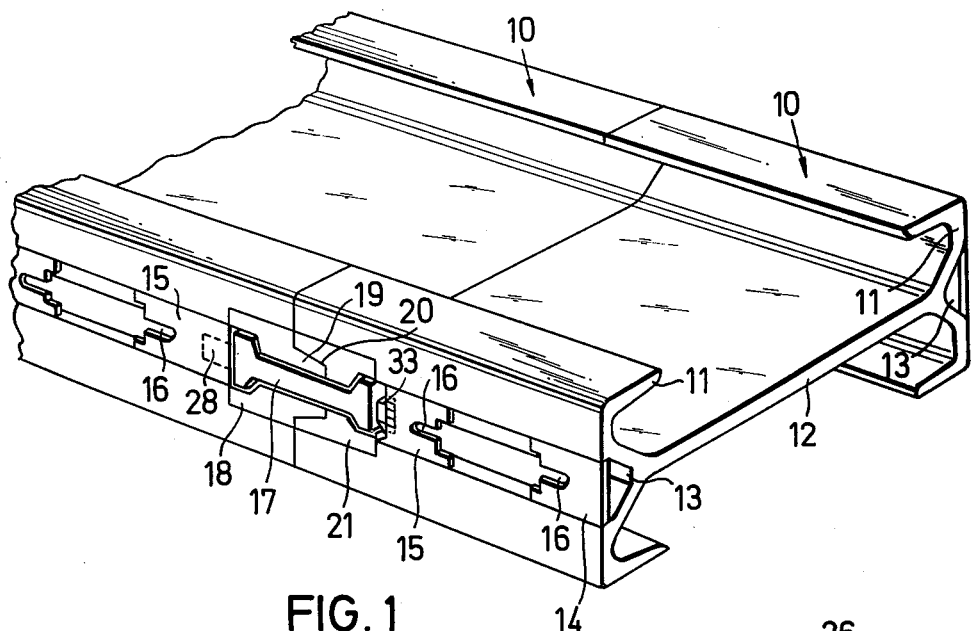
FIG. 1 is a diagrammatic perspective view of two channel sections of a scraper-chain conveyor connected together by connection means constructed in accordance with the invention.

In known manner, a scraper-chain conveyor is composed of a plurality of channel sections arranged end-to-end. FIG. 1 shows the adjoining parts of two such channel sections 10, each of which is constituted by side walls 11 having a generally sigma-shaped cross-section and a floorplate 12 welded between the V-shaped central portions 13 of the side walls. Each of the channel sections 10 is provided with a pair of spill-plate holders 14 and 15 which are welded to the goaf-side side wall 11 so as to cover the V-shaped portion 13 and to be spaced from the ends of that channel section. These holders 14 and 15 are provided with laterally open recesses 16 and serve to support spill-plates (not shown) which extend above the side walls 11 and increase the loading cross-section of the conveyor. The spill-plates are bolted to the holders 14 and 15, the bolts being inserted from the recessed sides of the holders so that their bolt heads are located behind the holders in the V-shaped portions 13.

The two channel sections 10 are connected together by means of a coupling member 17 and a pair of coupling elements 18 and 21, the coupling elements being welded to the adjacent ends of the channel sections in the regions of their V-shaped portions 13. The coupling element 18 has a projection 19 which mates, with an all-round clearance, with a recess 20 in the coupling element 21. This ensures that the two channel sections 10 have the required angular mobility. Each of the coupling elements 18 and 21 is formed with a respective laterally open recess 22 and 23 whose combined outline is adopted to the outer contour of the coupling member 17. The recess 22 and 23 are each provided with a widened portion 22' and 23' respectively for receiving the head portions (to be described below) of the coupling member.

Figure 5:
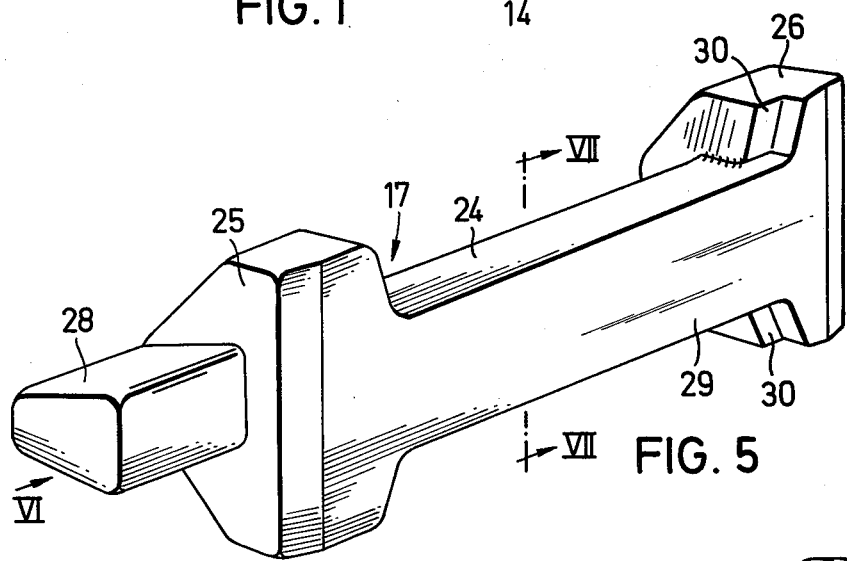
FIG. 5 is a perspective view, on a larger scale, of the coupling member which forms part of the connection means.
Figure 6:
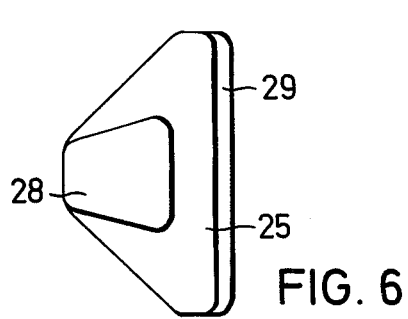
FIG. 6 is an end view of the coupling member looking in the direction of the arrow VI of FIG. 5.
Figure 7:
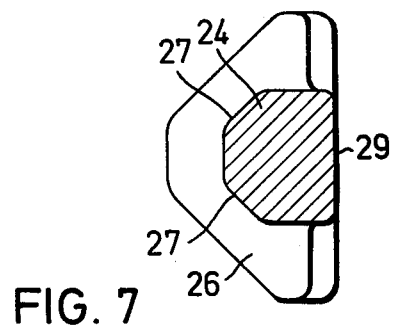
FIG. 7 is a cross-section taken on the line VII—VII of FIG. 5.

The coupling member 17, which is made as a one-piece casting or forging, comprises (see FIGS. 5 to 7) a shank 24 of generally square cross-section provided at each end thereof with an enlarged head portion 25 and 26 of generally triangular cross-section. These head portions 25 and 26 thus correspond generally to the shape of the widened portions 22' and 23' of the recesses 22 and 23. The two rearward edges 27 of the shank 24 are chamfered (see FIG. 7).

An axially-extending locking member 28, which is offset from the flat front face 29 of the coupling member 17, is provided on the head portion 25, this member 28 having a generally trapezoidal shape. A pair of locking projections 30 are provided on the head portion 26, these projections being formed in that region of the head portion 26 which merges with the shank 24. These projections 30 have an axial dimension which is smaller than that of the locking member 28, and are formed by recesses in the corner of the region where the head portion 26 merges with the shank 24 (see FIG. 5).

Figure 2:
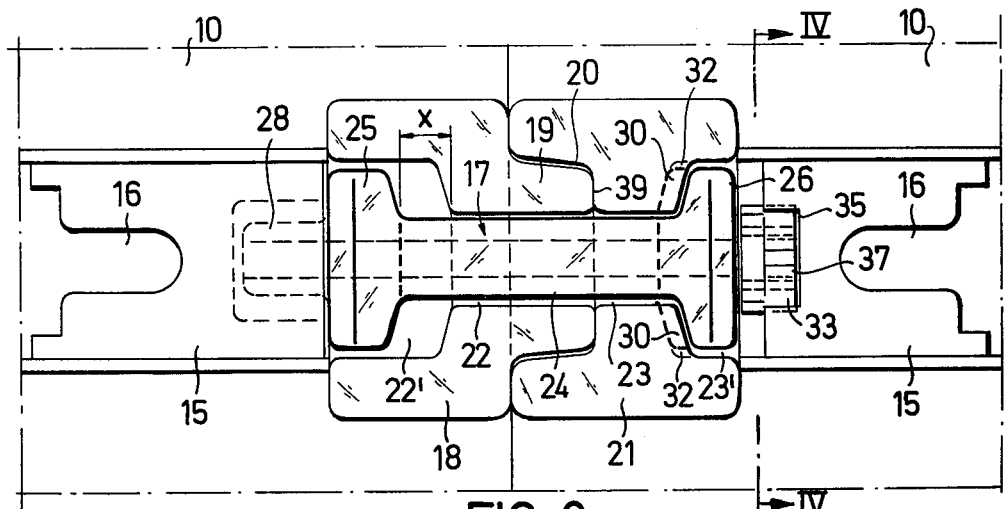
FIG. 2 is a side elevation of the connection means of FIG. 1.
Figure 3:
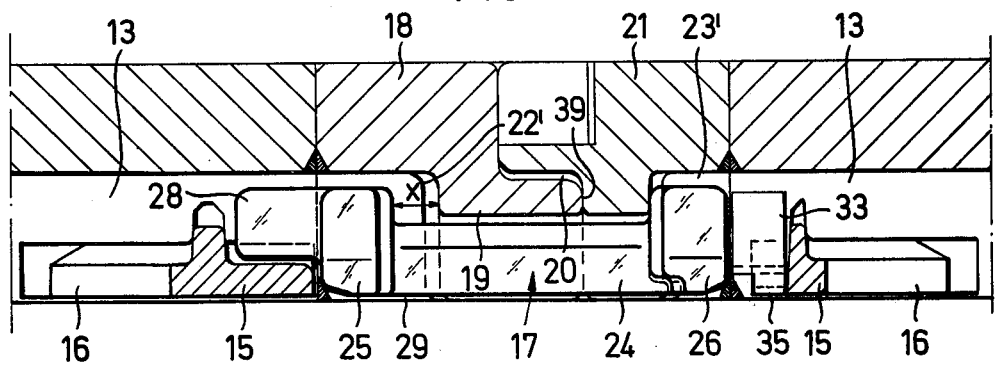
FIG. 3 is a horizontal cross-section of the connection means of FIGS. 1 and 2.

The connection between the two channel sections 10 is effected in such a manner that the projection 19 of the coupling element 18 extends into the recess 20 of the coupling element 21. The coupling member 17 is subsequently inserted into the recesses 22, 22' and 23, 23' obliquely from the side in such a manner that the locking member 28 lies behind the spill-plate holder 15 of the left-hand side channel section 10 (as seen in FIGS. 1 to 3). Then, by axially displacing the coupling member 17 within the recesses 22, 22' and 23, 23' it is possible to effect positive locking of the coupling member against the other coupling element 21, the locking projections 30, mating with corresponding locking recesses 32 provided on the coupling element 21. These locking recesses 32 are provided in that region where the widened recess 23' merges with the recess 23 which receives the shank 24 of the coupling member 17. In this way, both head portions 25 and 26 are prevented from slipping laterally out of the recesses 22, 22' and 23, 23' of the coupling elements 18 and 21. With the coupling member 17 in the position in which it connects the two coupling elements 18 and 21, its front face 29 is flush with the front faces of the connecting elements and with the plane of the outer surface of the side walls 11.

Figure 4:
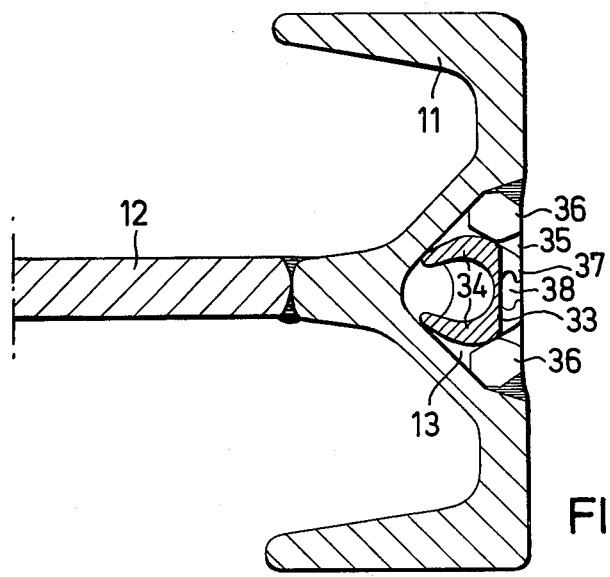
FIG. 4 is a cross-section taken on the line IV—IV of FIG. 2.

The coupling member 17 may be received axially in the coupling position by means of a retaining element 33 such as a C-shaped spring steel clip (see FIG. 4). The legs 34 of the clip 33 converge towards their free ends and are so dimensioned that, in use, they lie against the walls of the V-shaped portion 13 (see FIG. 4) of the right-hand side channel section 10 (as seen in FIGS. 1 to 3). The adjacent spill-plate holder 15 is provided with an aperture 35 for housing the clip 33, and flanges 36 at the top and bottom of the aperture 35. The flanges 36 are welded onto the V-shaped portion 13 of the channel section 10, and the clip 33 is inserted into the aperture 35 from the goaf side of the conveyor. The vertical space between the two flanges 36 is smaller than the corresponding dimension of the clip 33. Consequently, the clip 33 is elastically compressed as it is forced into the aperture 35. Once in position, the clip 33 is resiliently held between the flanges 36 and the V-shaped portion 13. The rear face of the clip 33 is provided with an attachment 37 having an undercut groove 38 into which a special tool (not shown) can be inserted in order to extract the clip from its aperture 35 when the connection betwen the two channel sections 10 is to be released. After the clip 33 is removed the coupling member 17 can be slid out of the recess 22, 22' and 23, 23' obliquely.

The clip 33 thus prevents the coupling member 17 moving far enough to the right (as seen in FIGS. 1 to 3) to enable the head portion 26 to be swung laterally out of the recess 23' as its locking projections 30 move out of contact with the recesses 32. If this was to occur, the coupling member 17 could slip obliquely out of the recess 22, 22' and 23 and the connection between the two channel sections 10 would be broken.

The coupling member 17 can be introduced into the recesses 22, 22' and 23, 23' because of the axial play X (see FIGS. 2 and 3) of the coupling member within these recesses. Once the locking projections 30 on the head portion 26 engage with the recesses 32 on the coupling element 21, the clip 33 is inserted to prevent the coupling member 17 moving axially back to the right. However, even if the clip 33 is removed and the coupling member 17 does move axially to the right by the full extent of the clearance X, the coupling member 17 will not drop out because the locking member 28 has a length which is greater than the dimension X so that the locking between the parts 15 and 28 is maintained. Consequently, the connection between the two channel sections is maintained as long as the coupling member 17 lies within the recesses 22, 22' and 23, 23' and parallel to the side wall 11. This means that the spring clip 33 is only required in cases where, for example, there are no parts such as side plates or plough guides attached to the channel sections 10.

Obviously, an identical connection means is provided on the other side walls of the channel sections 10. Thus, a whole series of channel sections 10 can be connected together in an easy and rapid manner, each pair of adjacent sections being connected together by two of the connection means described above.

We claim:

1. In connection means for connecting two adjacent channel sections of a scraper-chain conveyor, the side walls of the channel sections having a generally sigma-shaped cross-section, the connection means comprising two coupling elements fastened to the outer sides of the adjacent ends of the channel sections, and a coupling member for connecting the two coupling elements, the coupling member having a shank provided at each end with an enlarged head portion, the coupling elements being provided with laterally open recesses for receiving, with a predetermined amount of axial play, the coupling member, one of the coupling elements being provided with a projection which mates, with an all-round clearance, with a recess in the other coupling element, and a substantially C-shaped spring clip insertable into a V-shaped portion of the side wall of the other channel section to prevent axial movement of the coupling member by filling up the space available for said predetermined amount of axial play, the improvements comprising: the coupling member having a shank of square cross-section with two adjacent corners being chamfered and an enlarged head portion of triangular cross-section with blunted corners at each end of the shank, one of the head portions having an axially extending locking member of generally trapezoidal shape, and the other head portion having a pair of locking projections defined by recesses formed in that part of that head portion which merges with the shank.

2. A coupling member according to claim 1, wherein the axial dimension of the locking member is greater than the axial dimension of the locking projections.

3. Connection means for connecting two adjacent channel sections of a scraper-chain conveyor, the side walls of the channel sections having a generally sigma-shaped cross-section, the connection means comprising: two coupling elements fastened to the outer sides of the adjacent ends of the channel sections, and a coupling member for connecting the two coupling elements, the coupling member having a shank provided at each end with an enlarged head portion, the coupling elements having laterally open recesses for receiving, with a predetermined amount of axial play, the coupling member, one of the coupling elements having a projection which mates, with an all-round clearance, with a recess in the other coupling element, one head portion of the coupling member having an axially extending locking member which extends behind a complementary locking member fastened to one of the channel sections, and the other head portion of the coupling member having locking projection means which co-operate with corresponding locking recess means in the adjacent coupling element, and a substantially C-shaped spring clip insertable into a V-shaped portion of the side wall of the other channel section to prevent axial movement of the coupling member by filling up the space available for said predetermined amount of axial play.

4. Connection means according to claim 3, wherein the C-shaped spring clip is not loaded by force transmitted through the connection means.

5. Connection means according to claim 3, wherein the free ends of the legs of the spring clip converge towards each other and are so dimensioned as to lie against the wall portions of the said other channel section which define its V-shaped portion.

6. Connection means according to claim 3, wherein the locking recess means is provided in said one coupling element.

7. Connection means according to claim 3, wherein said other head portion is provided with a pair of locking projections which are defined by recess formed in that part of said other head portion which merges with the shank.

8. A scraper-chain conveyor, comprising: a plurality of channel sections having side walls of a generally sigma-shaped cross-section, each adjacent pair of channel sections being connected together by connection means, each connection means comprising two coupling elements fastened to the outer sides of the adjacent ends of the corresponding channel sections, and a coupling member for connecting the two coupling elements, the coupling member having a shank provided at each end with an enlarged head portion, the coupling elements having laterally open recesses for receiving, with a predetermined amount of axial play, the coupling member, one of the coupling elements having a projection which mates, with an all-round clearance, with a recess in the other coupling element, one head portion of the coupling member having an axially extending locking member which extends behind a complementary locking member fastened to one of the channel sections of the associated pair of adjacent channel sections, and the other head portion of the coupling member having locking projection means which co-operate with corresponding locking recess means in the adjacent coupling element, each connection means further including a C-shaped spring clip insertable into a V-shaped portion of the side wall of the other channel section of the associated pair of adjacent channel sections, whereby axial movement of the coupling member is prevented by the C-shaped spring clip filling up the space available for said predetermined amount of axial play.

9. A scraper-chain conveyor according to claim 8, wherein the spring clip of each connection means is locked in position behind flanges provided on the associated channel section.

10. A scraper-chain conveyor according to claim 8, wherein each of the channel sections is provided with a respective spill-plate holder positioned adjacent to each of its two coupling elements, one of the spill-plate holders of each channel section constituting the complementary locking member of the connection means associated with one adjacent channel section, and the other spill-plate holder of that channel section defining a seat for the detachable fixing of the C-shaped spring clip of the connection means associated with the other adjacent channel section.

11. A scraper-chain conveyor according to claim 10, wherein the flanges associated with each connection means are provided on the adjacent spill-plate holder.

* * * * *